United States Patent [19]

Lee et al.

[11] Patent Number: 5,663,237
[45] Date of Patent: Sep. 2, 1997

[54] GRAFT COPOLYMERIZATION IN SUPERCRITICAL MEDIA

[75] Inventors: Sunggyu Lee, Akron, Ohio; Soonjong Kwak, Troy; Fouad Azzam, Grand Island, both of N.Y.

[73] Assignee: The University of Akron, Akron, Ohio

[21] Appl. No.: 490,954

[22] Filed: Jun. 15, 1995

[51] Int. Cl.⁶ .......................... C08F 2/00; C08F 255/00; C08F 259/04
[52] U.S. Cl. .......................... 525/285; 525/296; 525/301; 525/308; 525/309; 525/461; 525/322; 526/941
[58] Field of Search .................. 525/285, 296, 525/301, 308, 309, 461, 322; 526/941

[56] References Cited

U.S. PATENT DOCUMENTS

| | | | |
|---|---|---|---|
| 4,451,633 | 5/1984 | Brownscombe et al. | 526/348.6 |
| 4,748,220 | 5/1988 | Hartmann | 526/89 |
| 4,933,404 | 6/1990 | Beckman et al. | 526/207 |
| 4,990,595 | 2/1991 | Traechkner et al. | 528/483 |
| 4,997,804 | 3/1991 | Pekala | 502/418 |
| 5,026,147 | 6/1991 | Soane et al. | 350/374 |
| 5,312,882 | 5/1994 | DeSimone | 526/201 |
| 5,412,027 | 5/1995 | Shine | 525/63 |

OTHER PUBLICATIONS

Radiation Physics and Chemistry, vol. 44, No. 6, pp. 597–601. Dec. 1994.
Macromolecules, vol. 28, No. 12, pp. 4067–4074. Jun. 5, 1995.
DeSimone, "Dispersion Polymerizations in Supercritical Carbon Dioxide," *Science*, vol. 265, 15 Jul. 1994, pp. 356–359.
Odian, G., "Principles of Polymerizations," Wiley, N.Y., 1991, 3rd edition, p. 719.

*Primary Examiner*—Irina S. Zemel
*Attorney, Agent, or Firm*—Renner, Kenner, Greive, Bobak, Taylor & Weber

[57] ABSTRACT

A supercritical graft copolymerization process is described which includes the steps of: adding a polymer into a high pressure reactor; adding a free radically polymerizable monomer into the reactor; adding a free radical polymerization initiator; adding a sufficient amount of a supercritical solvent to dissolve at least a portion of the polymer and the monomer when supercritical conditions are achieved inside the reactor; and heating and pressurizing the reactor to achieve supercritical conditions therein for a time sufficient to effect a graft copolymerization on the polymer by the polymerizing monomer which forms at least one side chain on the polymer. In general, the reaction pressure will range from 70 atm. to 200 atm. and the reaction temperature will range from 50° C. to 90° C. In the examples provided above, the supercritical solvent was carbon dioxide. However, there is no need to limit the application to such in that the process steps will be equally applicable to other supercritical solvents which have the ability to dissolve at least a portion of the polymer and grafting monomer when at supercritical conditions in the reactor. In general, the reaction time will range from one to six hours, although shorter and longer reaction times are contemplated within the scope of this invention, the range merely being listed as the best mode known to the inventors at the time of the filing of this application. Specifically, the graft copolymerization process has been demonstrated when the polymer is a polyolefin, particularly polypropylene and poly(vinyl chloride), although other backbone polymers are certainly contemplated as within the scope of this invention. Specific examples are discussed wherein the monomer used to effect the graft copolymerization are selected from the group consisting of styrene and acrylic acid when the polyolefin polymer is polypropylene and also specifically discussed is a poly(vinyl chloride) polymer wherein the grafted polymer is based on a monomer of vinyl acetate.

8 Claims, 9 Drawing Sheets

GRAFT COPOLYMERIZATION IN SUPERCRITICAL MEDIA

TECHNICAL FIELD

This invention relates to graft polymerizations in supercritcal media, such as carbon dioxide.

BACKGROUND OF THE INVENTION

A graft copolymer is a polymer comprising molecules with one or more species of block connected to the main chain as side chains, having constitutional or configurational features that differ from those in the main chain, exclusive of the branch points. The simplest case of a graft copolymer can be represented by structure (I)

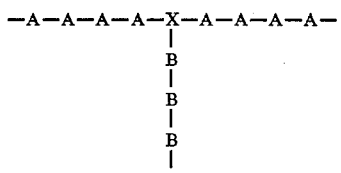

where a sequence of A monomer units is referred to as the main chain or backbone, the sequence of B units is the side chain or graft, and X is the unit in the backbone to which the graft is attached. In graft copolymers, the backbone and side chains may both be homopolymeric, the backbone may be homopolymeric and the side chains copolymeric or vice versa, or both backbone and side chains may be copolymeric but of different chemical compositions. Branching in one or more stages and crosslinking may occur.

Graft polymerization is a common method for modifying polymer properties. Because the main chain and the branch chain are usually thermodynamically incompatible, most graft copolymers can be classified as multiphase polymers in the solid state. Free-radical polymerization methods are the oldest and most widely used procedures for the synthesis of graft polymers, because they are relatively simple.

Historically, graft copolymers have been prepared by polymerization of a monomer in the presence of a preformed backbone. The monomer can be polymerized by any of the traditional modes of polymerization. Backbones for free-radical graft copolymerization require the presence of an atom or group that can be abstracted or displaced by another radical, by radiation of sufficient intensity, or by mechanical degradation. Although free-radical graft copolymerization methods are the simplest, oldest, and most widely used, the least specific grafting sites and the most poorly defined branches result. Backbones for ionic or condensation polymerization require a reactive site or functional group capable of participating in specific chemical reactions. The products are well-defined and the properties of the branches can be controlled.

Graft copolymers can be prepared by copolymerizing preformed branches with the monomer constituting the major portion of the backbone. The branch must have an end group capable of copolymerizing with the monomer by the mode of polymerization used. Alternatively, preformed branches can be coupled with a backbone, if it has functional groups that can react with an end-group on the preformed branch.

Conventional techniques for graft copolymerizations use excessive amounts of toxic liquid solvents to dissolve the polymer, which in turn requires an expensive solvent recovery schemes in the process. Supercritical processing exploits non-toxic, non-flammable, and inexpensive carbon dioxide as a solvent which can be completely removed from the product by simply depressurizing the system.

In U.S. Pat. No. 4,748,220 to Hartmann et al., describes the preparation of pulverulent crosslinked copolymers in supercritical carbon dioxide under superatmospheric pressure in the presence of a free radical initiator. The monomer mixtures which were polymerized consisted of from (a) 70 to 99.99% by weight of monoethylenically unsaturated carboxylic acids, their amides and/or esters of such carboxylic acids and aminoalcohols, (b) from 0.001 to 10% by weight of a diethylenically or polyethylenically unsaturated monomer, and (c) from 0 to 20% by weight of other monoethylenically unsaturated monomers.

In U.S. Pat. No. 4,933,404 to Beckman et al., the use of supercritical fluids to polymerize monomers in a microemulsion system. This system comprises a first phase including a low-polarity material which is a gas at standard temperature and pressure, and which has a cloud-point density. It also includes a second phase including a polar fluid, typically water, a monomer (preferably soluble in the polar fluid), and a microemulsion promoter for facilitating the formation of micelles including the monomer in the system. The weight average molecular weight of the polymeric material polymerized at a temperature about the supercritical temperature of the fluid material is preferably at least 25%, more preferably at least 50%, and most preferably at least 100% greater than the weight average molecular weight of the polymeric material produced under substantially the same reaction conditions except that the polymerization is conducted at a temperature below the supercritical temperature of the fluid material.

In U.S. Pat. No. 4,990,595 to Traechkner et al., the melt viscosity of aromatic polycarbonates, aromatic polyester carbonates and aromatic and/or aliphatic polyesters in the molten state are treated with supercritical gases, is considerably lowered so that basic chemical operations which proceed only incompletely under the usual conditions can be carried out on these thermoplastics.

SUMMARY OF THE INVENTION

The use of supercritical media, such as supercritical carbon dioxide is described for the graft copolymerization of a second polymer onto the backbone of a first polymer.

It is an object of this invention to show the graft polymerization of poly(vinyl acetate) onto poly(vinyl chloride).

It is another object of this invention to show the graft polymerization of polystyrene onto polyolefins such as polypropylene.

It is yet another object of this invention to show the graft polymerization of poly(acrylic acid) onto polyolefins such as polypropylene.

It is a further object of this invention to graft copolymerize other reactive monomers to commodity polymers such as polyethylene, polypropylene, and polystyrene.

It is still a further object of this invention to provide a graft polymerization process wherein the supercritical $CO_2$ is removed from the grafted copolymer by simply depressurizing the system.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
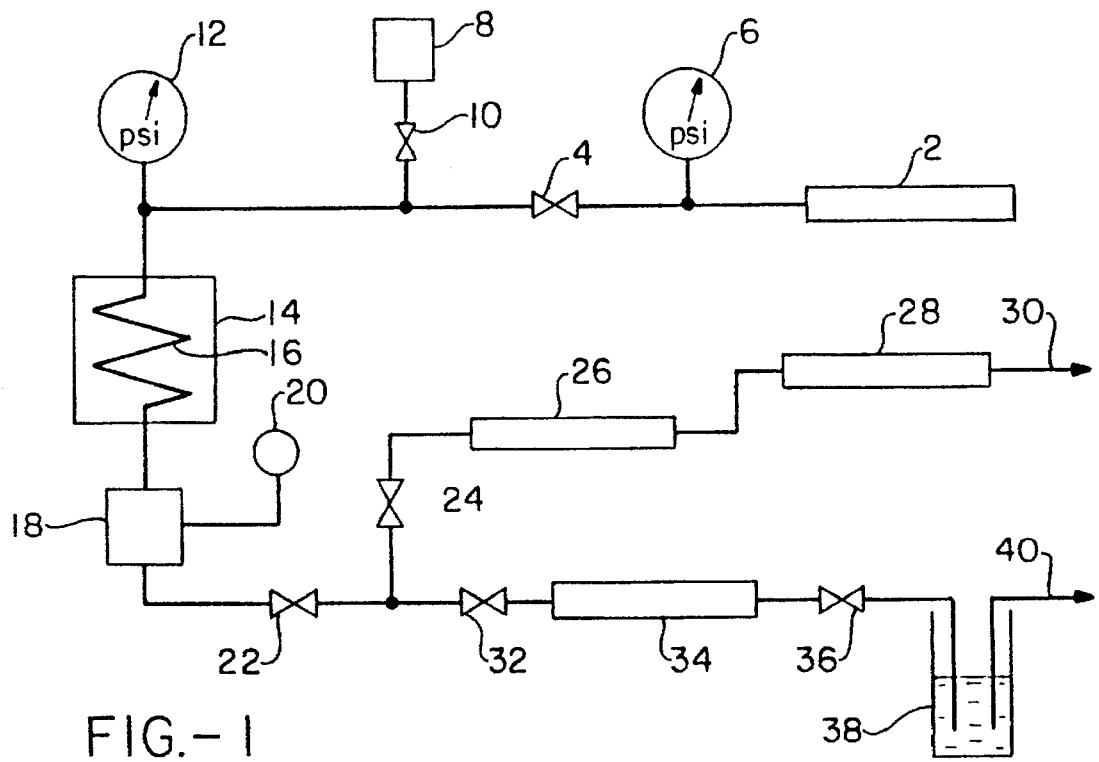
FIG. 1 is a flow diagram of the supercritical graft copolymerization system.

Referring now to the drawings wherein the showings are for purposes of illustrating the preferred embodiment of the invention only and not for purposes of limiting the same, the Figures show flow diagrams representing the equipment used in the supercritical $CO_2$ graft copolymerizations, and multiple graphic characterizations of the extent of the graft copolymerization reactions for several polymer systems.

The best mode for carrying out the invention will now be described for the purposes of illustrating the best mode known to the applicant at the time. The examples are illustrative only and not meant to limit the invention, as measured by the scope and spirit of the claims.

Poly(Vinyl Chloride)-g-Poly(Vinyl Acetate)

Reactants

The poly(vinyl chloride), (PVC), and the vinyl acetate, (VAc), were both obtained from the Aldrich Chemical Company. The poly(vinyl chloride) used had an inherent viscosity of 0.92. The vinyl acetate as initially obtained was inhibited with 3–5 ppm hydroquinone. This hydroquinone inhibitor was removed by passing the vinyl acetate through an inhibitor remover packed column obtained from Aldrich Chemical Company. These columns are known and passing monomers through these packed columns, will efficiently remove either hydroquinone and monomethyl ether hydroquinone or tert-butylcatechol without any other treatment. The azobisisobutyronitrile (AIBN) was obtained from the Eastman Kodak Company and was used as received.

Polymer Initiator

The decomposition rate of initiator depends on the reaction temperature and solvents Used in the reaction. AIBN is commonly used at 50°–70° C. The value of the decomposition rate constant in this temperature range is approximately $10^{-6}$ to $10^{-5}$ $sec^{-1}$.

Process Conditions

The reaction temperature was varied in the range of 50°–70° C. The reaction pressure was in the range of 70–200 atm. As shown in FIG. 1, a preweighed amount of poly(vinyl chloride), vinyl acetate (20% PVC by weight) and AIBN (3% PVC by weight) was charged in a high pressure reactor (18) and a $CO_2$ bomb (2) was filled with dry ice. The $CO_2$ bomb (2) was heated by means of heating tape to generate a pressure of 3000 psi as measured by the inline gauge (6) with valve (4) in the off position. The reactor (18) was subsequently pressurized with $CO_2$ by opening the flow valve (4) and with monitoring through inline pressure gauge (12) followed by heating to the desired temperature controlled with a temperature sensor (20). Preheater (14) was used to facilitate the process. If desired, a solvent could be added through solvent reservoir (8) through valve (10). The run time for each reaction was two (2) hours. The reactor was depressurized after the two (2) hour reaction by opening valves (22) and (32) into depressurization cylinder (34). After release of some of the pressure though of $CO_2$ through a pair of activated carbon beds (26) and (28) to effluent line (30), the polymer sample was collected in a dry ice/acetone bath (38).

Extraction Procedure

The grafted products consist of grafted poly(vinyl chloride) (PVC-g-PVAc), homopolymer poly(vinyl acetate), ungrafted poly(vinyl chloride), and unreacted vinyl acetate. The product was extracted with boiling methanol to remove the residual vinyl acetate and homopolymer poly(vinyl acetate) for at least 24 hours. It was then dried in a vacuum oven. The filtrate was analyzed by FTIR to confirm the extraction of poly(vinyl acetate) homopolymer.

FTIR Analysis

The grafted poly(vinyl chloride) sample was dissolved in tetrahydrofuran (THF) at room temperature. It was casted into a thin film on a sodium chloride window.

Figure 3:
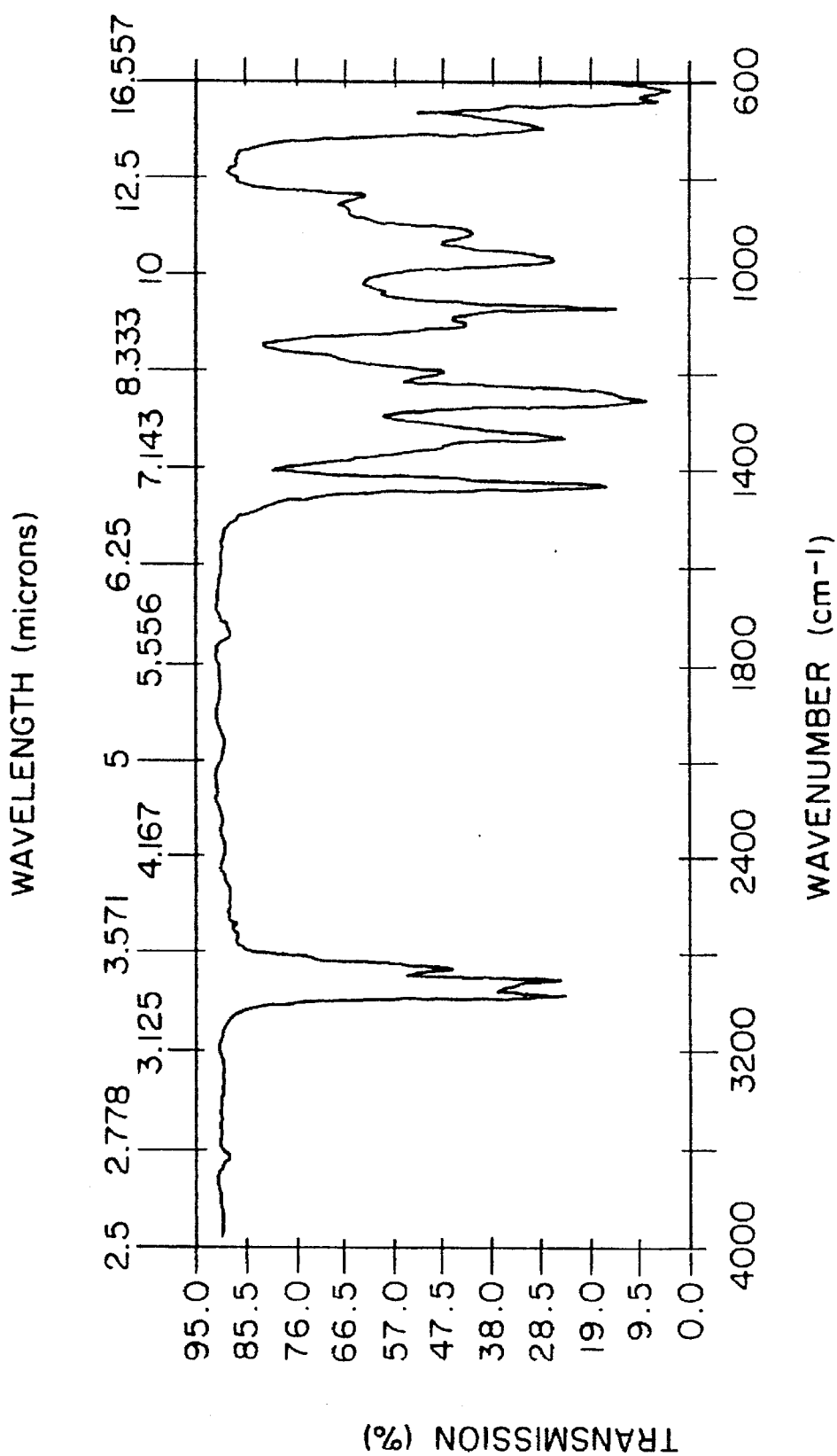
FIG. 3 is an FTIR (Fourier Transform Infra-Red) spectra of poly(vinyl chloride) homopolymer.
Figure 4:
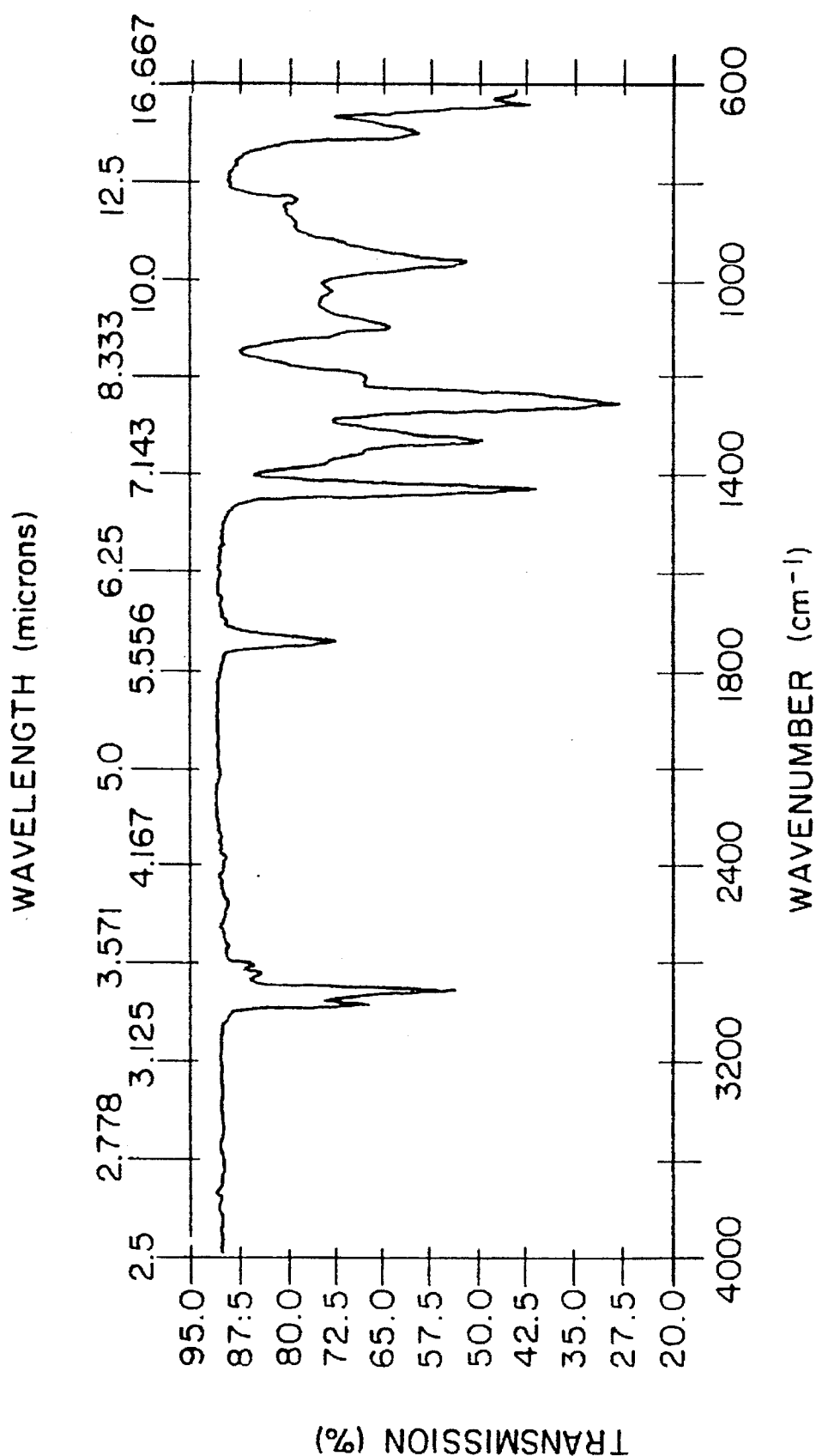
FIG. 4 is an FTIR spectra of grafted poly(vinyl acetate) onto poly(vinyl chloride)

The FTIR spectra of homopolymer poly(vinyl chloride) and grafted poly(vinyl chloride) is shown in FIGS. 3 and 4 respectively. The carbonyl (C=O) stretching absorption at about 1737 $cm^{-1}$ is characteristic of the ester group which confirms the grafting of vinyl acetate in the poly(vinyl chloride) chain.

Polypropylene-g-Polystyrene

Materials

Polypropylene (MW 250,000) in the form of fine resins was obtained from Aldrich Chemical Co. Styrene obtained from Fisher (99.8%) was washed with 10% NaOH aqueous solution to remove the inhibitors and then washed with distilled water. This was then dried over anhydrous $MgSO_4$ and finally distilled under a near vacuum condition. It was stored at $-78°$ C. before use. Bone dry grade $CO_2$ (99.8%) was supplied by Linde and used as received. Azobisisobutyronitrile (AIBN) was obtained from Eastman Kodak Co. and was used as received.

Experimental System

Figure 2:
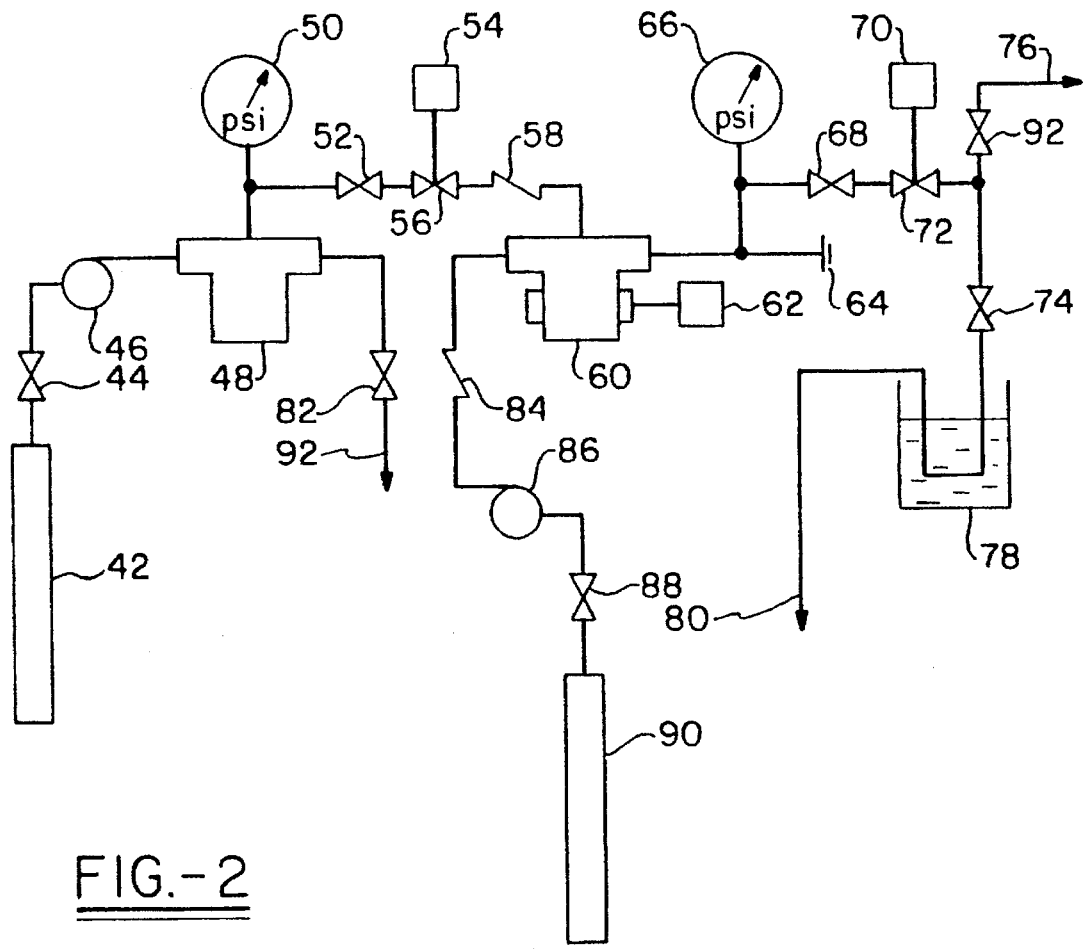
FIG. 2 is an alternative arrangement flow diagram of the supercritical graft copolymerization system.

A flow schematic of the experimental system for graft copolymerization in a supercritical $CO_2$ fluid medium is shown in FIG. 2. $CO_2$ (42) was compressed in a high pressure vessel (Parr), which acted as a storage tank (48), using a compressor (Haskel) (46) with shutoff valve (44) and gauge (50). The main part of the experimental unit was a high pressure 300 cc stainless steel reactor (60) with bolt closure. The high pressure reactor, manufactured by Autoclave Engineers, Inc., has a maximum working pressure of 60.3 MPa at $343°$ C. and was fitted with a rupture disk (64) rated at 34.6 MPa. The reactor was equipped with a turbine type impeller which was magnetically coupled to an external shaft with a V-belt pulley. An exact amount of $CO_2$ was charged through shutoff valve (52) to a predetermined pressure using a micro-metering valve (56). The reactor pressure was measured by a Bourdon-type gauge (66) with minor graduations of 34.5 kPa. A check valve (58) was installed between the metering valve (56) and the reactor (60) to prevent the reverse flow of $CO_2$. A flexible silicone rubber tape was wrapped around the reactor to provide it with uniform heat and was controlled by a temperature controller (62). The thermocouple of the controller reached 12.7 cm. down inside the reactor. The reactor was insulated using an insulated blanket. A cold trap (78) was installed at the outlet of the reactor (80) to capture the unreacted monomer in the effluent.

A high pressure micro-metering pump (86) was used to inject the monomer (90) through shutoff valve (88) into the reactor which was precharged with $CO_2$ at a high pressure. The monomer was pumped at the reaction temperature and pressure to prevent its premature homopolymerization. The pump is designed to deliver liquid against a pressure of 34.5 MPa and has a flow range of 0.2-8 ml/min. A check valve (84) was installed between the reactor (60) and the micro-metering pump (86).

Experimental Procedure

Preweighed amounts of polypropylene and AIBN were charged to the reactor. The reactor was closed and the $CO_2$ storage tank (48) was filled with $CO_2$ up to the desired pressure using a compressor (46). Vacuum (76) was applied to the reactor (60) to remove the air inside by appropriate configuration of the shutoff valves (92, 74, 68). A predetermined weight of gas was introduced into the reactor at $40°$ C. by using the micro-metering valve (56). The reactor pressure at $40°$ C. was calculated with a computer simulation using the Soave equation of state, "Equilibrium Constants from a Modified Redlich-Kwong Equation of State", *Chem. Eng. Sci.*, 27, 1197 (1972) which has a relatively simple form and acceptable accuracy. The impeller was tamed on and the temperature of the reactor was increased to the desired value. At the reaction temperature, a metered amount of monomer was charged into the reactor using the high pressure micro-metering pump (86). The maximum weight percentage of monomer which allowed the reaction medium to remain supercritical at the reaction temperature and pressure was obtained from the critical points data measured experimentally by for example, the method of Suppes and McHugh "Phase Behavior of the Carbon Dioxide—Styrene System", *J. Chem. Eng. Data*, 34, 310 (1989). The monomer weight percentage was varied within the supercritical region.

The reaction times examined were in the range of 1 to 6 hours. The temperature was varied between $75°$ C. and $90°$ C. The decomposition rate constant ($k_d$) of AIBN in $CO_2$ has different values depending on the temperatures and pressures. The half-life time of the initiator for the conditions of interest was between 10 to 15 hours. The reaction pressure was varied from 14.06 MPa to 19.66 MPa.

After the reaction time has elapsed, the reactor was depressurized by opening the outlet valve. The effluent was passed through the cold trap (78) to capture the monomer dissolved in the $CO_2$ and the gas was vented to the atmosphere (80). The monomer transfer line was washed with water immediately after the reaction to prevent clogging resulting from polymerization.

Extraction Procedure

After the completed reaction, the product consisted of mixtures of grafted copolymer, ungrafted polymer, homopolymer of the monomer, and the unreacted monomer. The product was extracted in a soxhlet extractor for about 48 hours using cyclohexane to remove any homopolymerized polystyrene formed during graft copolymerization. The extracted polymer product was dried in a vacuum oven to remove any residual solvent. It was then subsequently characterized with FTIR.

Characterization Techniques

FTIR spectroscopy was used for qualitative as well as quantitative identification of grafting onto polypropylene. The measurement was made on the Bio-Rad FTS 7 spectrometer system. Any given sample was dissolved in p-xylene and then was cast into a thin film. The film was then subjected to IR measurement. A DuPont Model 910 differential thermal analyzer was used for thermal analysis. The instrument was calibrated using indium. All runs were made in a dry nitrogen atmosphere at a heating rate of $0°$ C./min except near the glass transition range where the heating rate was maintained at $2°$ C./min. The glass transition temperature ($T_g$) was defined as a peak point of the first derivative curve. The thermogravimetric studies were made on a DuPont TGA 2950 analyzer. The samples were heated at a rate of $20°$ C./min or were subjected to isothermal condition for 8 hours at $275°$ C.

Results and Discussion

FTIR Analysis

Figure 5:
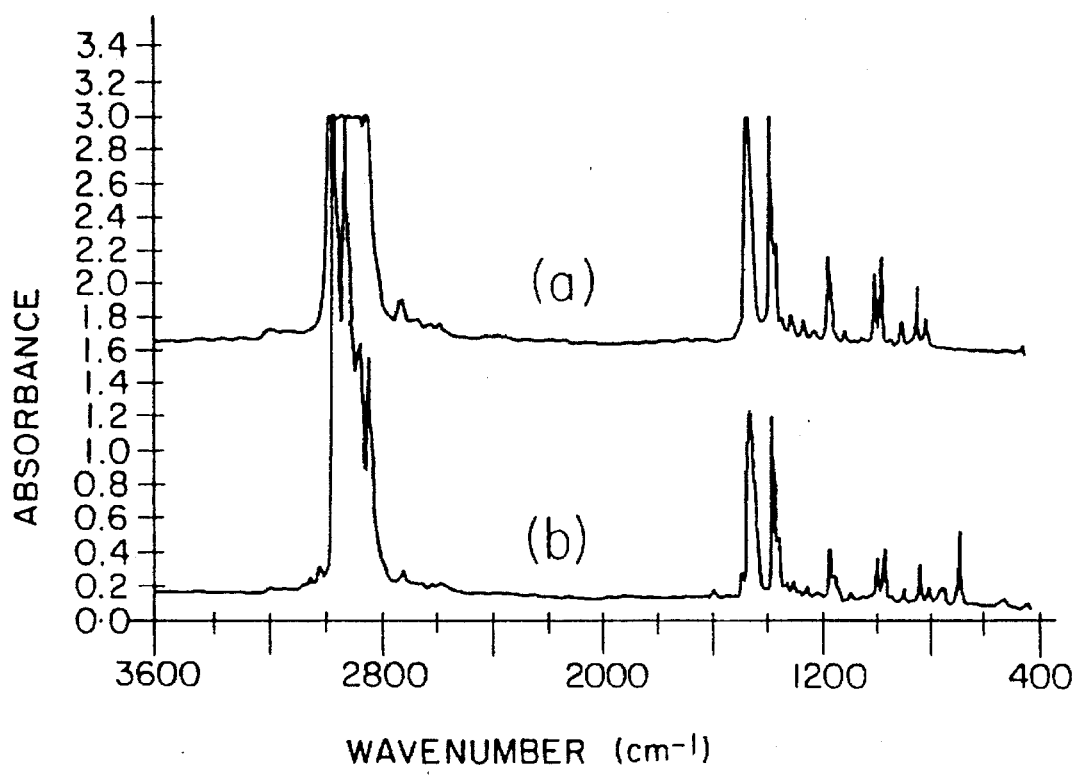
FIG. 5 is an FTIR spectra showing the comparison of homopolymer polypropylene and grafted polystyrene onto polypropylene.
Figure 6:
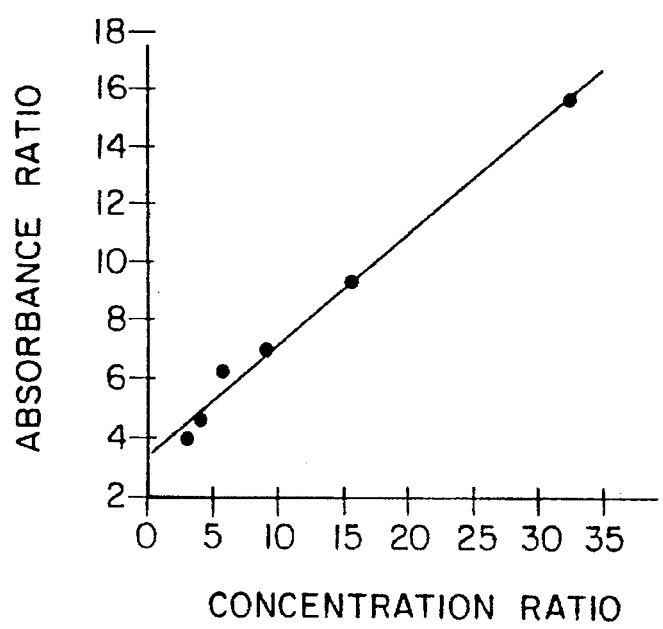
FIG. 6 is a calibration plot for determining the mass percent grafting of polystyrene in polypropylene-g-polystyrene.

Both qualitative and quantitative analyses of grafted copolymer were made from the FTIR spectra. The absorption due to the phenyl group in the grafted polystyrene chain appears at 700 and 1493 $cm^{-1}$. The peaks are clearly seen by comparison of a spectrum of homopolymer polypropylene with that of polystyrene-g-polypropylene as shown in FIG. 5. FIG. 6 shows the calibration curve for the determination of weight percent grafting onto polypropylene. The calibration curve was prepared from the polypropylene and polystyrene mixture of known composition. The absorbance ratio between $CH_2$ scissoring band at 1428 $cm^{-1}$ and the phenyl peak at 1493 $cm^{-1}$ ($A_{CH_2}/A_{Ph}$) was expressed as a function of concentration ratio of propylene to styrene units ($C_p/C_{st}$).

Thermal Analysis

Figure 7:
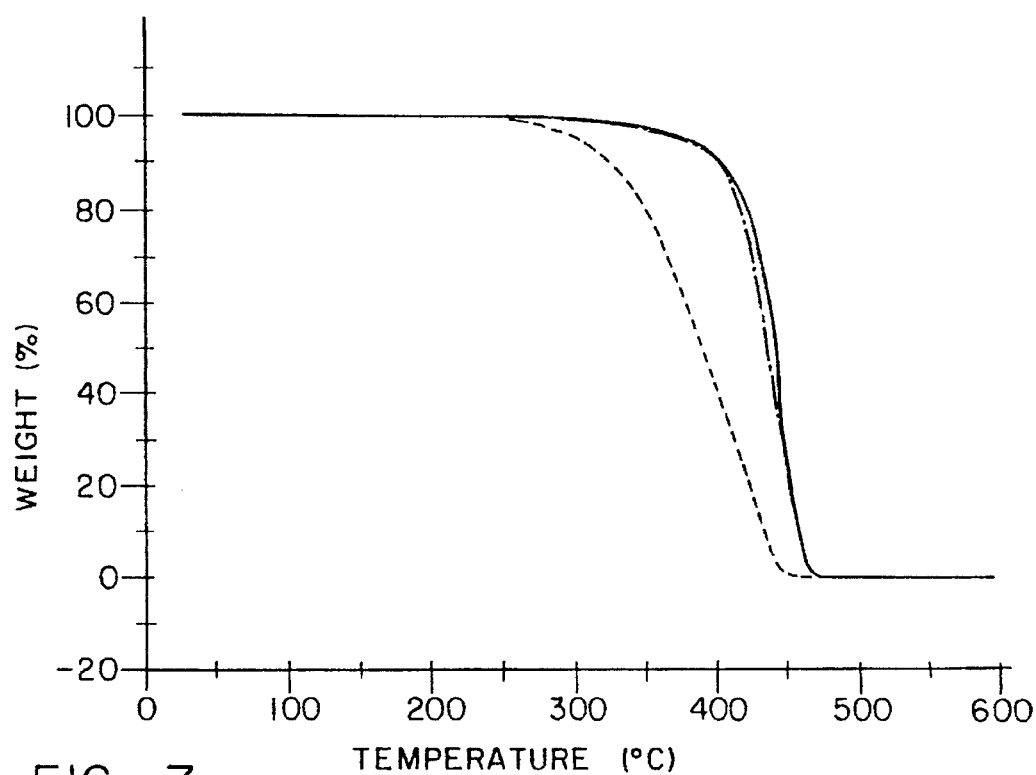
FIG. 7 is a Thermal Gravimetric Analysis (TGA) comparison for homopolymer polypropylene and polypropylene-g-polystyrene at 10° C./min.
Figure 8:
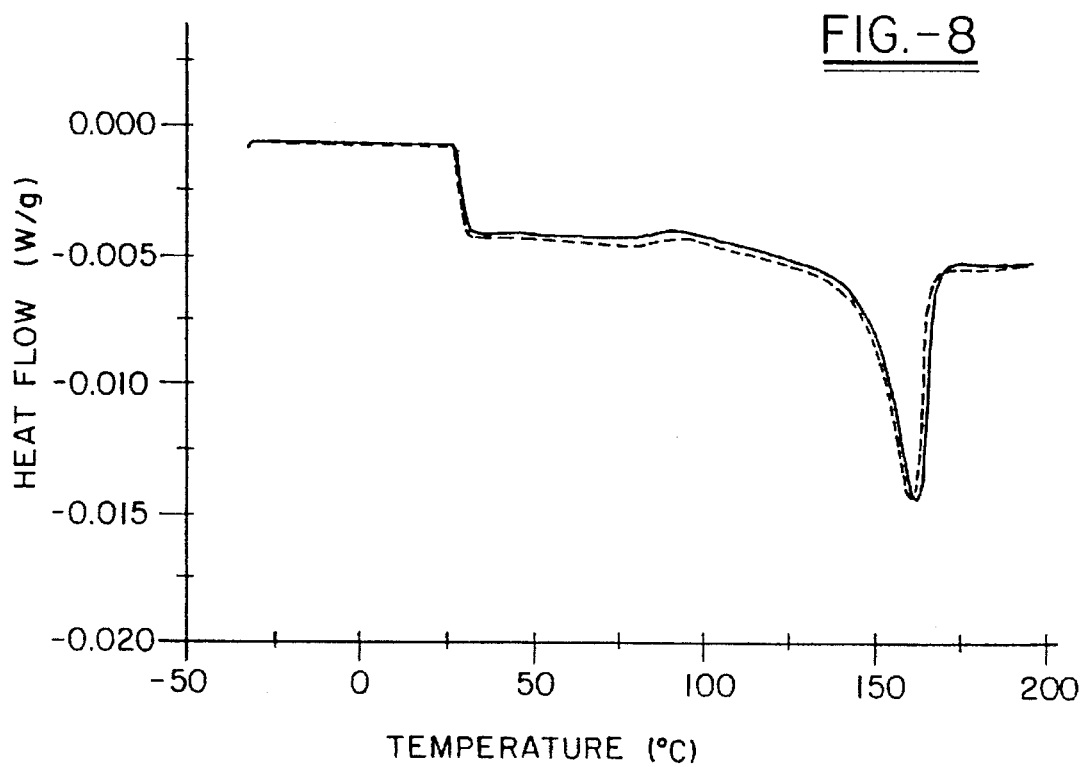
FIG. 8 are Differential Scanning Calodmetry (DSC) thermograms of homopolymer polypropylene and polypropylene-g-polystyrene.

FIG. 7 shows TGA results for polypropylene-g-polystyrene, compared with homopolymer polypropylene. It is evident that the grafting of styrene onto polypropylene increases the thermal degradation of polypropylene. This is due to the fact that polypropylene is thermally more stable than polystyrene. So side chains of polystyrene grafted onto polypropylene accelerates its decomposition rate. The effect of grafting on the degradation can be more clearly seen in the isothermal experiments. FIG. 8 shows the DSC thermogram of homopolymer polypropylene compared with the grafted one. It can be easily seen that there is only a single $T_g$ and a single $T_m$ corresponding to the glass transition and melting point temperature of the grafted copolymer.

Critical Points Data Analysis

The data for critical points are important to obtain the appropriate experimental conditions. The critical points for the $CO_2$-styrene mixture were measured experimentally by Suppes and McHugh. The reaction temperature and pressure of the experiments were kept above the critical point of the mixture. Thus at the reaction temperature and pressure, the $CO_2$ and styrene formed a homogenous one-phase medium. The product after the graft copolymerization reaction was free of $CO_2$ solvent.

Effect of Reaction Temperature

Figure 9:
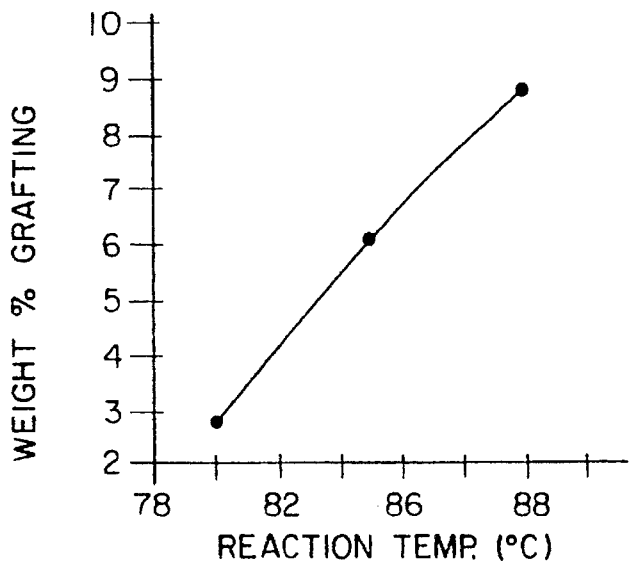
FIG. 9 is a plot of weight percent grating vs. reaction temperature (°C.) showing the effect of temperature on the weight percent grafting.

FIG. 9 shows the effect of reaction temperature on the grafting percentage. The other reaction parameters, i.e., time, initiator concentration, monomer concentration, and pressure were kept constant. It can be seen that the grafting increases with temperature. It was observed that at higher temperatures, there is an increasing tendency towards homopolymerization of the monomer besides grafting onto the polymer backbone.

Effect of Monomer concentration

Figure 10:
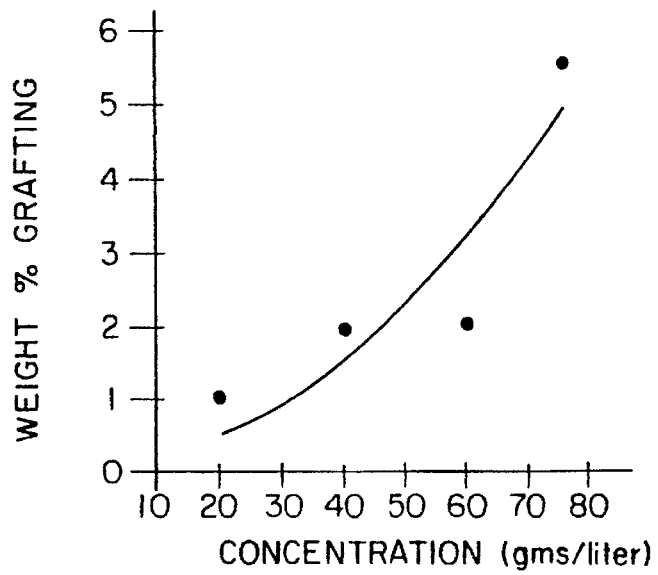
FIG. 10 is a plot of weight percent grafting vs. monomer concentration (g/L) showing the effect of monomer concentration on the weight percent grafting.

The effect of monomer concentration can be seen in FIG. 10. At lower concentrations, there was a very low conversion leading to low grating yield. After a certain critical value, the copolymerization rate and grafting percentage increases.

Effect of Pressure

Figure 11:
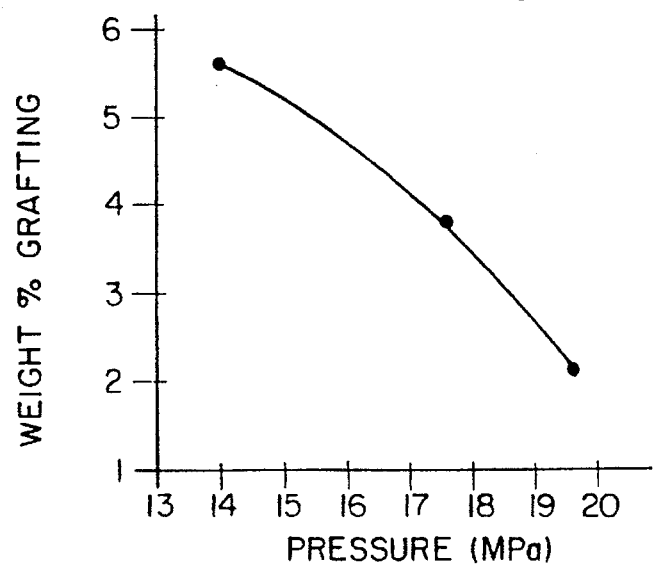
FIG. 11 is a plot of the weight percent grating vs. pressure (MPa) showing the effect of pressure on the weight percent grafting.

The experimental results for the dependence of pressure on weight percent grafting are shown in FIG. 11. The reaction time was kept at 4 hours and the temperature was fixed at 75° C. It was observed that weight percent grafting decreases with pressure. Although homopolymerization of styrene is favored by the pressure, it is believed that the weight percent grating decreased since the sorption of styrene in the polymer phase decreases with pressure.

Polypropylene-g-Poly(Acrylic Acid)

Materials

Polypropylene (MW 250,000) in the form of fine resins was obtained from Aldrich Chemical Co. Acrylic acid (99%) obtained from Aldrich contained 200 ppm of monoethyl ether hydroquinone (MEHQ) inhibitor. This inhibitor was removed by passing it through inhibitor removing column (Aldrich) containing molecular sieves. The pure acrylic acid was stored in refrigerator at −78° C. before its use. Bone dry grade $CO_2$ (99.8%) was supplied by Linde and used as received. Azobisisobutyronitrile (AIBN) was obtained from Eastman Kodak Co. and was used as received.

Experimental System

A flow schematic of the experimental system for graft copolymerization in a supercritical $CO_2$ fluid medium is shown in FIG. 2 and the discussion pertinent to that Figure is equally applicable in this instance with the substitution of poly(acrylic acid) for polystyrene.

Extraction Procedure

After the completed reaction, the product consisted of mixtures of grafted copolymer (PP-g-PAAc), ungrafted polymer (polypropylene), homopolymer of the monomer (PAAc), and the unreacted monomer. The product was extracted in a soxhlet extractor for at least 48 hours in boiling methanol to remove homopolymer of acrylic acid formed during the reaction.

The grafting reaction is carded out in a heterogeneous system where substrate polymer (,polypropylene) is solid. When product is taken out of the reactor, it is probable that a part of the homopolymer (poly(acrylic acid)) formed in the matrix of the substrate polymer is occluded in a state in which extraction is hindered. In this particular case, the apparent graft contains not only true graft chemically bonded to the mink polymer, but also unextractable homopolymer of acrylic acid entangled in the matrix of polypropylene. This entanglement gives rise to cyclization (partly due to hydrogen bonding) which may lead to a topological copolymer and further to interpenetrating networks. It has been proposed that some crosslinking could occur under the conditions of high concentrations of propagating chains. These networks could be formed between polypropylene grafts of various lengths or between propagating chain ends and oxo radicals of polypropylene chains. These resulted in some insoluble part in the product solution when dissolved in classical solvents of polypropylene like p-xylene and o-dichlorobenzene. In other words, a true solution is never obtained with grafted polypropylene chains.

In practice, apparent grating is of practical importance for the modification of surface properties, compatibility etc. So long as the graft polymer (poly(acrylic acid)) in the reaction product is insoluble in the solvent, the problem of whether it is really connected with its one end as a graft to the substrate polymer or not does not play a significant role.

Characterization Techniques

FTIR spectroscopy was used for qualitative identification as well as quantitative determination of grafting onto polypropylene. The measurement was made on the Bio-Rad FTS 7 spectrometer system. Any given sample was dissolved in p-xylene and then was cast into a thin film. The film was then subjected to IR measurement. A DuPont Model 910 differential thermal analyzer was used for thermal analysis. The instrument was calibrated using indium. All runs were made in a dry nitrogen atmosphere at a heating rate of 10° C./min except near the glass transition range where the heating rate was maintained at 2° C./min. The glass transition temperature ($T_g$) was defined as a peak point of the first derivative curve. The thermogravimetric studies were made on a DuPont TGA 2950 analyzer. The samples were heated at a rate of 10° C./min or were subjected to isothermal condition for 8 hours at 275° C.

Calibration Procedure

Figure 12:
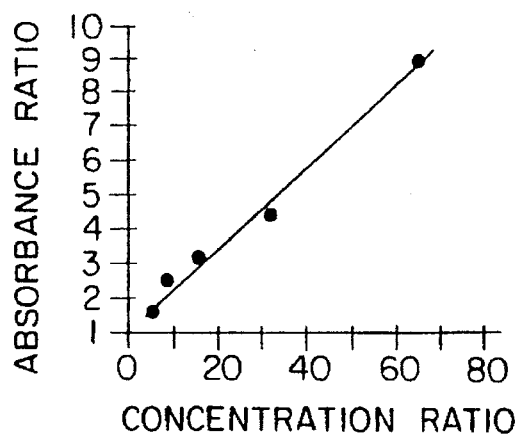
FIG. 12 is a plot of the absorbance ratio vs. concentration ratio showing the calibration plot for the determination of the mass percent grafting in polypropylene-g-poly(acrylic acid)

FIG. 12 allows the calibration plot for determination of weight percent grafting of poly(acrylic acid) onto polypropylene. It was prepared from polypropylene and polyacrylic acid) mixture of known composition. Since polypropylene and poly(acrylic acid) do not dissolve in a common solvent, an appropriate amount of each were dissolved separately. First polypropylene solution was cast into a film on a petri dish kept at 80°–85° C. Once all the solution appeared to vaporize, then poly(acrylic acid) solution in methanol was poured onto it. The solvent immediately vaporized leaving a uniform poly(acrylic acid) film on the polypropylene film. Thus different films with various concentrations of poly (acrylic acid) were prepared. These then were subjected to FTIR measurements. The absorbance ratio between $CH_2$ scissoring band at 1454 cm$^{-1}$ and C=O stretching band at around 1700 cm$^{-1}$ ($A_{CH_2}/A_{C=O}$) was expressed as a function of concentration ratio of propylene to acrylic acid units ($C_p/C_{AAc}$).

Results and Discussion

FTIR Analysis

Figure 13:
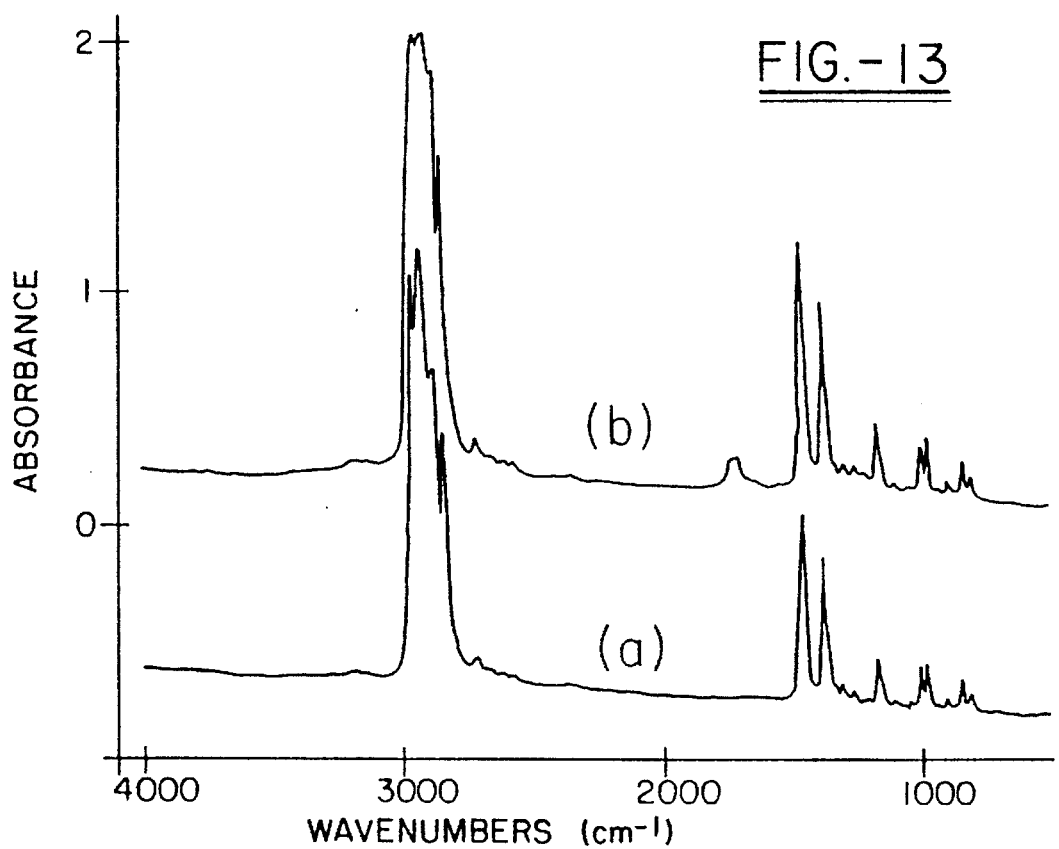
FIG. 13 is a plot of absorbance vs. wavenumbers ($cm^{-1}$) showing a comparison of the FTIR spectra of homopolymer polypropylene and polypropylene-g-poly(acrylic acid)
Figure 14:
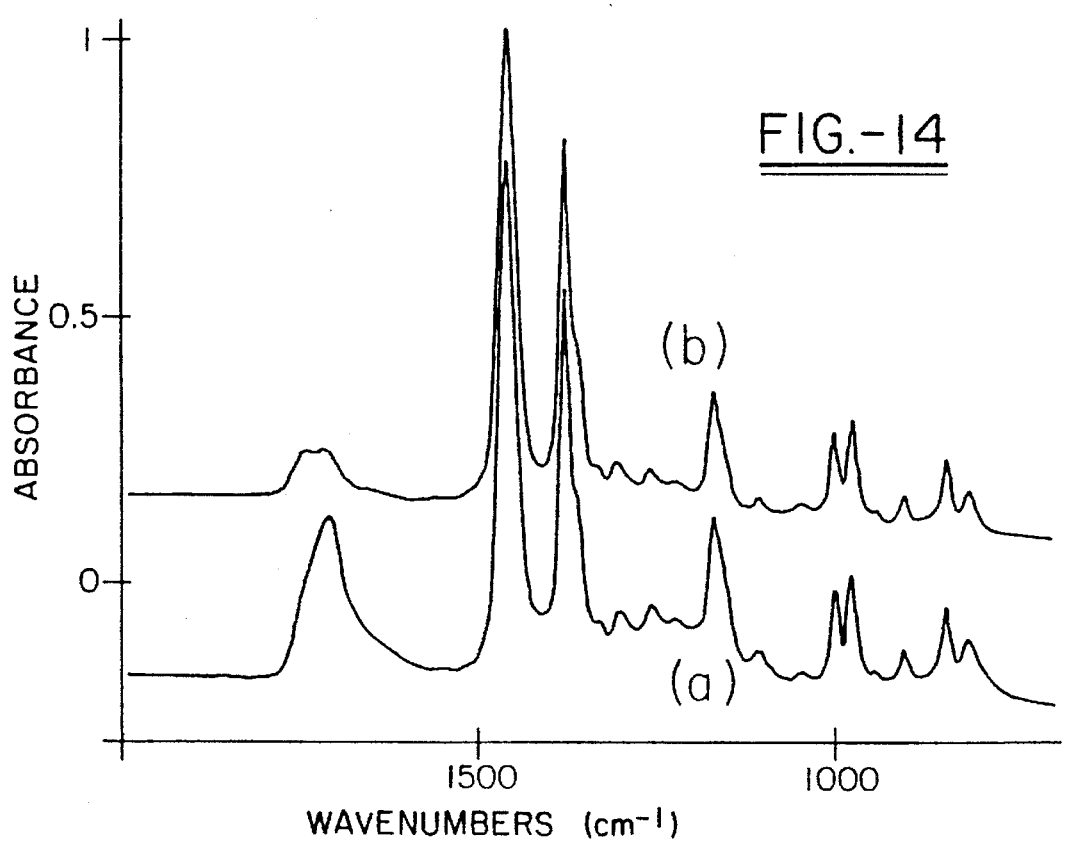
FIG. 14 is a plot of absorbance vs. wavenumbers ($cm^{-1}$) showing a comparison of the FTIR spectra of homopolymer polypropylene and polypropylene-g-poly(acrylic acid) in the 1000–2000 $cm^{-1}$ region.

Both qualitative and quantitative analyses of grafted copolymer were made from the FTIR spectra. The absorption due to the carbonyl group in the grafted poly(acrylic acid) chain appears at around 1700 cm$^{-1}$. The peak is clearly seen by comparison of a spectrum of homopolymer polypropylene with that of polypropylene-g-poly(acrylic acid) as shown in FIG. 13. FIG. 14 shows the comparison of spectra between the blend of polypropylene and poly(acrylic acid) and poly(acrylic acid) grafted polypropylene. It can be observed that the carbonyl stretching band in the grafted case consists of two peaks, one at 1710 cm$^{-1}$ due to associated carbonyl group (H bonding) and the other at around 1730 cm$^{-1}$ due to non-associated carbonyl group. This implied that there are some isolated acrylic acid units attached as side chains along some oligomeric units. Unlike this, in a blend spectrum, the peak at around 1710 cm$^{-1}$ is single and broad indicating that all the carbonyl groups are associated. The presence of these carbonyl groups associated by hydrogen bonding is indeed an indication of consecutive acid units in the polymer molecule. The number of these groups is higher in the blend than in a graft copolymer.

Thermal Analysis

Figure 15:
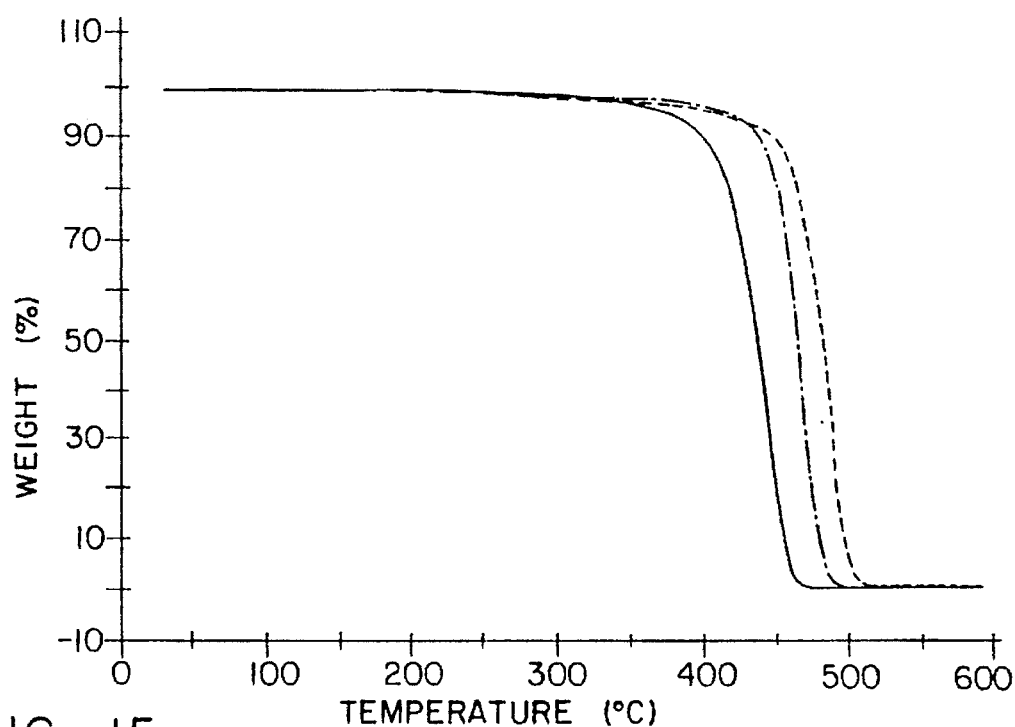
FIG. 15 is a comparison of the TGA curves for homopolymer polypropylene and polypropylene-g-poly(acrylic acid) at 10° C./min.
Figure 16:
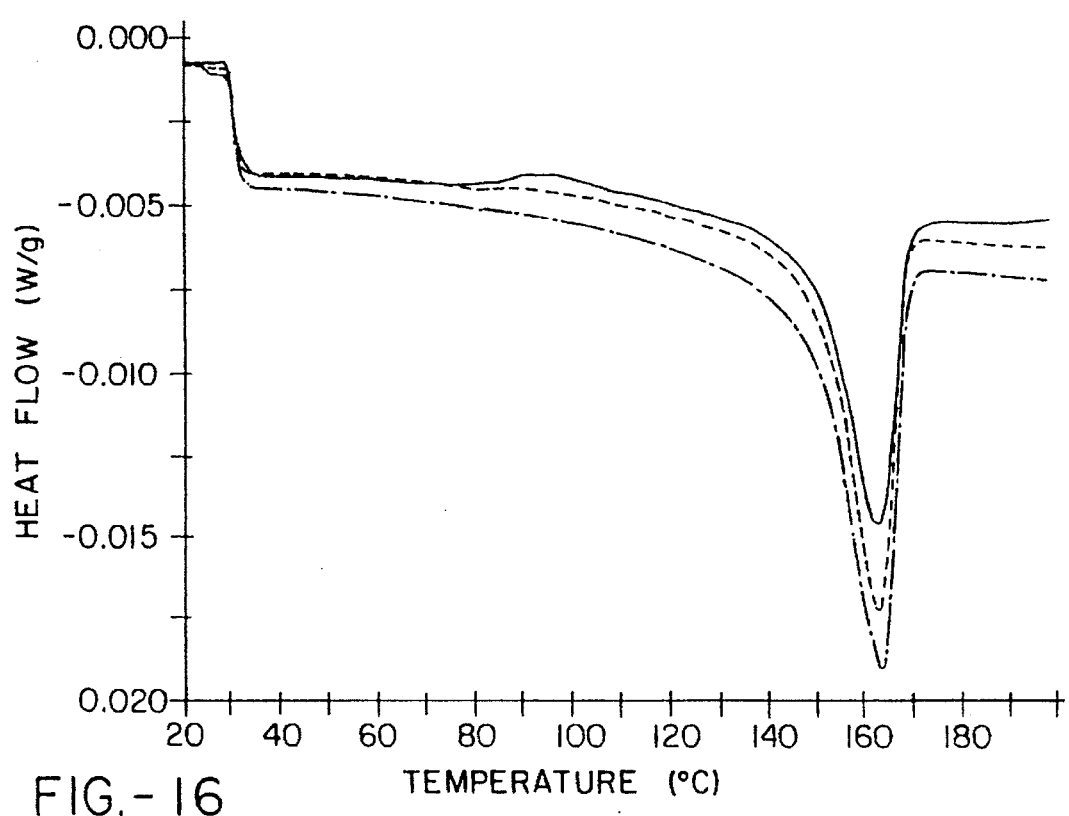
FIG. 16 is a series of DSC thermograms of homopolymer polypropylene and polypropylene-g-poly(acrylic acid) at 10° C./min.

FIG. 15 shows TGA results for polypropylene-g-poly (acrylic acid), compared with homopolymer polypropylene. It can be clearly seen that grafting of acrylic acid onto polypropylene increases the thermal stability of polypropylene. This is due to the fact that poly(acrylic acid) is thermally more stable than polypropylene which results in retardation of degradation rate of polypropylene. The effect of grafting on degradation can be more clearly seen in the isothermal experiments. FIG. 16 shows the DSC thermograms of homopolymer polypropylene compared with the grafted ones. It was observed that grafting did not affect the melting temperature of polypropylene to a significant degree. At this point, it is not clear whether this is due to the experimental error or not.

Effect of Reaction Temperature

Figure 17:
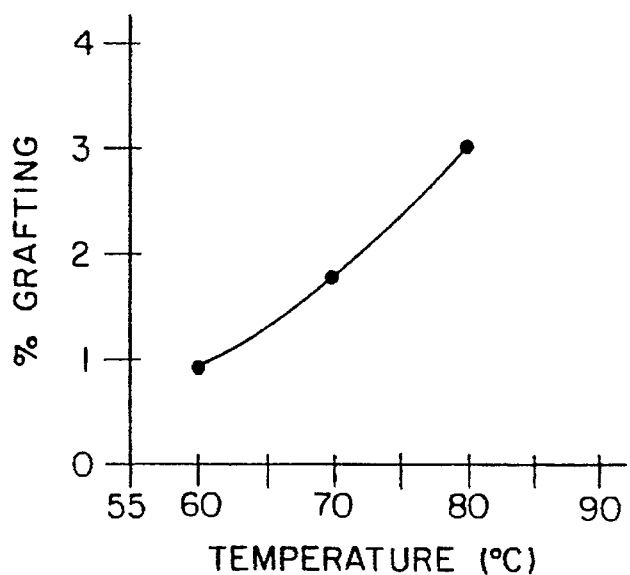
FIG. 17 is a plot of the percentage grafting vs. reaction temperature (°C.)

FIG. 17 shows the effect of reaction temperature on the grafting percentage. The other reaction parameters, i.e., time, initiator concentration, monomer concentration etc. were kept constant. It can be seen that the grating increases slightly with temperature. In general, it was observed that even though most of the monomer had reacted during the reaction time, the grafting yield was very low. This is because most of the acrylic acid formed its homopolymer and very little attached itself as side chain grafts to polypropylene.

Effect of Reaction Time

Figure 18:
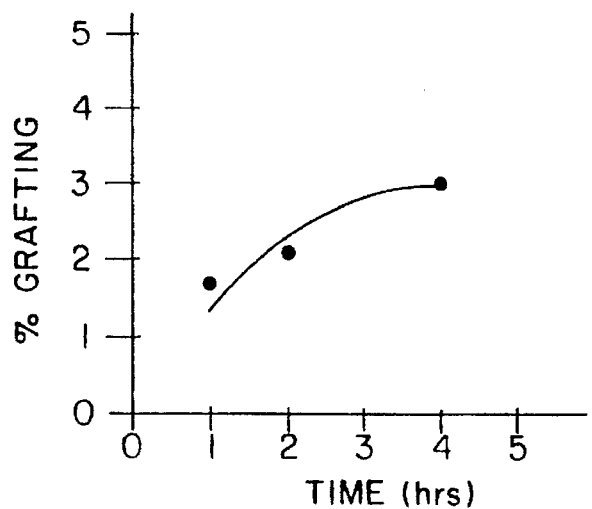
FIG. 18 is a plot of the percentage grafting vs. reaction time (hrs.).

The effect of time of reaction on grafting yield can be seen in FIG. 18. Time was varied between 1 to 4 hours. The temperature was fixed at 80° C. The other parameters like monomer and initiator concentration were also kept constant at 33.3 gms/lit and 0.67 gms/lit respectively. Like temperature, grafting increases with time as expected but not to a great extent since homopolymer formed was much higher as time increased.

Discussion

Supercritical graft copolymerizations are advantageous for several reasons. $CO_2$ is non-toxic, non-flammable and inexpensive. Supercritical $CO_2$ causes considerable swelling and significant depression of the glass transition temperature of the polymer. Mass transfer in a supercritical medium is very high. The dissolving power of supercritical fluids can be easily controlled by adjusting the temperature and pressure of the system. The grafting efficiency is very high and the process is easily adaptable to other polymer systems. While this process requires a high pressure unit compared to conventional solvent-phase grafting, a smaller reactor volume is used in comparison to conventional technology.

The use of supercritical fluids for chromatography and/or extraction is applicable to a wide variety of compound classes. Of all the application areas, polymers have probably benefited more than any other from the use of supercritical fluids. Polymers and polymer additives that are found in foods, textiles, surfactants, cosmetics and the petroleum industries are all areas where supercritical fluid chromatography (SFC) and supercritical fluid extraction (SFE) are presently finding widespread acceptance and use. One advantage of SFE is that it reduces the use of organic solvents in the laboratory. Disposal costs of solvents are a rapidly increasing expense which SFE can greatly reduce. Another advantage of SFE is that it often offers a reduction in time required for an extraction. Also, by making small changes in density (i.e., temperature or pressure of the fluid), it is possible to use a single supercritical extraction fluid to perform selective extraction of a wide range of solutes.

The following table shows the critical properties of some selected fluids in comparison with $CO_2$.

| Fluid | Critical Temperature (°C.) | Critical Pressure (atm) |
|---|---|---|
| Carbon dioxide | 31.1 | 72.9 |
| Ethane | 32.4 | 49.5 |
| Ethylene | 9.3 | 49.7 |
| Propane | 96.7 | 41.9 |
| Propylene | 91.9 | 45.6 |
| Nitrous oxide | 36.6 | 73.4 |
| Water | 374.4 | 224.1 |
| Ammonia | 132.5 | 111.3 |

These fluids span a wide range of solvent strength, but for practical purposes, the range used is restricted. Fluid like ammonia is corrosive and toxic, and is usually ruled out for extraction purposes. Ethane and propane are flammable in nature and therefore, require special safety considerations. Nitrous oxide has a similar solubility parameter to that of carbon dioxide, but is more polar and hence is better suited for some solute displacing applications. Another limitation of carbon dioxide is its inability to extract polar compounds at typical working pressures (80–500 atm.).

Carbon dioxide can be used for extraction of polymeric material with low polarity and molecular weight only. Fluids like propane and methylene chloride in supercritical state, have proved to be useful for the solvation of high molecular weight polymers. Propane is a fluid whose solvent characteristics can be changed drastically in various regimes of the pressure-temperature phase space. Hence, it can be used as a single supercritical fluid selectively to separate a lube oil feed stock into paraffin wax, asphalt, heavy ends, naphthenes and purified light oil. Compressed liquid butane and pentane have a higher solvent power for heavy hydrocarbons, and therefore, are effective solvents in dissolving high molecular weight components.

Thus, what has been shown is a supercritical graft copolymerization process which includes the steps (no order being implied) of: adding a polymer into a high pressure reactor; adding a monomer into the reactor; adding a free radical polymerization initiator to initiate the preformed polymer; adding a sufficient amount of a supercritical solvent to dissolve at least a portion of the polymer and the monomer when supercritical conditions are achieved inside the reactor; and heating and pressurizing the reactor to achieve supercritical conditions therein for a time sufficient to effect a graft copolymerization on the polymer by the monomer which forms at least one side chain on the polymer. In general, the reaction pressure will range from 70 atm. to 200 atm. and the reaction temperature will range from 50° C. to 90° C. In the examples provided above, the supercritical solvent was carbon dioxide. However, there is no need to limit the application to such in that the process steps will be equally applicable to other supercritical solvents which have the ability to dissolve at least a port/on of the polymer and grating monomer when at supercritical conditions in the reactor.

In general, the reaction time will range from one to six hours, although shorter and longer reaction times are contemplated within the scope of this invention, the range merely being listed as the best mode known to the inventors at the time of the filing of this application. Specifically, the graft copolymerization process has been demonstrated when the polymer is a polyolefin, particularly polypropylene and poly(vinyl chloride), although other backbone polymers are certainly contemplated as within the scope of this invention. Specific examples are discussed wherein the monomer used to effect the graft copolymerization are selected from the group consisting of styrene and acrylic acid when the polyolefin polymer is polypropylene and also specifically discussed is a poly(vinyl chloride) polymer wherein the grafted polymer is based on a monomer of vinyl acetate. It of course is envisioned that other polymeric combinations are within the scope of this invention.

Potential non-limiting exemplary additional candidate graft polymer systems would include the following:

| Polymer | Monomers which can be grafted onto the polymer backbone |
| --- | --- |
| polyethylene | styrene, methacrylic acid, acrylamide |
| polystyrene | acrylic acid, maleic anhydride, methyl acrylate |
| poly(methyl methacrylate) | vinyl acetate, acrylic acid |
| polycarbonate | butyl acrylate, styrene |
| polypropylene | acrylonitrile, methyl methacrylate, maleic anhydride, methacrylic acid |
| poly(vinyl chloride) | methyl methacrylate, acrylonitrile |

While in accordance with the patent statutes, a best mode and preferred embodiment have been described in detail, the invention is not limited thereto, rather the invention is measured by the scope of the attached claims.

What is claimed is:

1. A graft copolymerization process which comprises the steps of:

adding a preformed polymer derived from at least one ethylenically unsaturated monomer into a high pressure reactor;

adding a free radical polymerization initiator into the reactor to free radically initiate the polymer;

adding an ethylenically unsaturated monomer reactive with the initiated polymer into the reactor;

adding a sufficient amount of a supercritical solvent to dissolve at least a portion of the polymer and the monomer when supercritical conditions are achieved inside the reactor; and heating and pressurizing the reactor to achieve supercritical conditions therein for a time sufficient to effect a graft polymerization of the monomer to the initiated polymer, whereby the monomer forms at least one side chain on the polymer.

2. The process of claim 1 wherein the reaction pressure is from 70 atm. to 200 atm. and the reaction temperature is from 50° C. to 90° C.

3. The process of claim 2 wherein the supercritical solvent is carbon dioxide.

4. The process of claim 3 wherein the reaction time is from one to six hours.

5. The process of claim 4 wherein the polymer is selected from the group consisting of a polyolefin and poly(vinyl chloride).

6. The process of claim 5 wherein the polyolefin is selected from the group consisting of polyethylene and polypropylene.

7. The process of claim 6 wherein the monomer is selected from the group consisting of styrene and acrylic acid and the polyolefin is polypropylene.

8. The process of claim 5 wherein the polymer is poly (vinyl chloride) and the monomer is vinyl acetate.

* * * * *